April 10, 1956     D. W. BARTON ET AL     2,741,256
TURBINE GOVERNOR
Filed Nov. 19, 1954
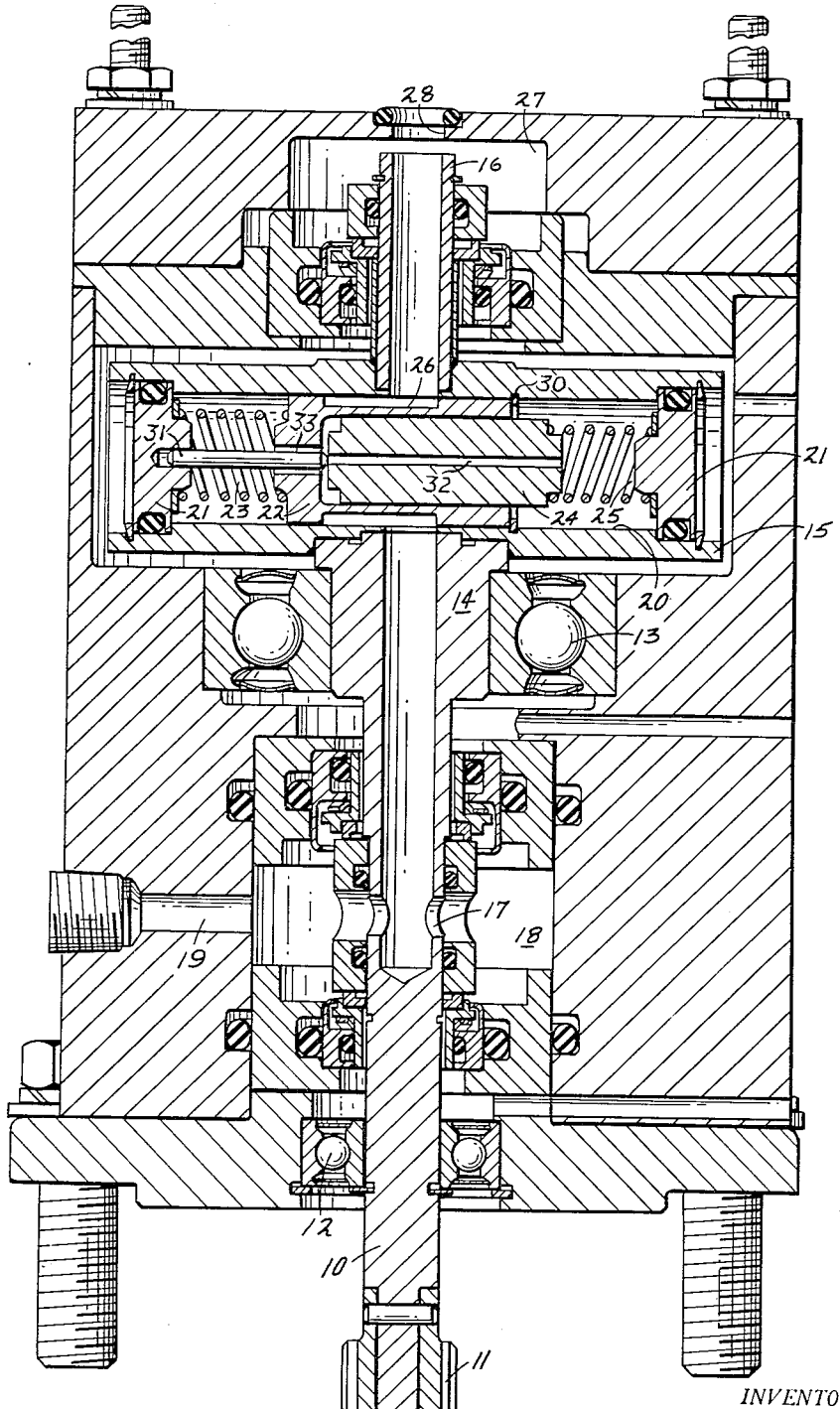
INVENTOR.
DAVID W. BARTON.
JACK C. BASSIE.
BY
E. C. McRae
J. L. Faulkner
L. H. Oster
ATTORNEYS

United States Patent Office 2,741,256
Patented Apr. 10, 1956

2,741,256
TURBINE GOVERNOR

David W. Barton, Birmingham, and Jack C. Bassie, Detroit, Mich., assignors to Ford Motor Company, Dearborn, Mich., a corporation of Delaware Application November 19, 1954, Serial No. 469,930

3 Claims. (Cl. 137—56)

This invention is directed to a device for controlling the rate of flow of a fluid in response to the speed of a shaft and more specifically to a device adaptable to govern an internal combustion engine or turbine and to prevent overspeeding thereof.

This invention is best understood by reference to the drawing which is a cross section of the apparatus comprising this invention.

In the drawing the rotatable shaft is indicated by the numeral 10. This shaft is driven from the mechanism to be controlled through spline 11 and journalled in bearings 12 and 13. Shaft 10 terminates at its upper end in boss 14 which in turn is secured as by welding to the lower portion of cylindrical carriage 15. Upper shaft 16 is hollow, is concentric with shaft 10 and is secured to the upper portion of cylindrical carriage 15 as by welding. It will be seen that shaft 10, spline 11, cylindrical carriage 15, and shaft 16 are coaxial and rotate as a unit. Shaft 10 is provided with radial holes 17 at a location intermediate cylindrical carriage 15 and bearing 12 and is hollow from this location to its upper end where it is secured to cylindrical carriage 15. Radial holes 17 communicate with opening 18 which is drained by conduit 19. Cylindrical carriage 15 is provided with stepped bore 20 which is closed by plugs 21. Hollow cylindrical element 22 slides within the bore 20 and is spring urged to the right by spring 23. Similarly a cylindrical element 24 slides within the interior of element 22 and is urged to the left by spring 25. The dimensions of elements 22 and 24 are so chosen that the center of gravity of element 22 is to the left of the axis of shaft 10 and the center of gravity of element 24 is to the right of the axis of shaft 10. Element 22 is provided with a peripheral groove 26 which communicates under some circumstances with the hollow portions of shaft 10 and shaft 16. The upper end of shaft 16 terminates in opening 27 which in turn terminates in conduit 28.

When the above described apparatus is employed as a governor for a turbine or internal combustion engine the fuel flows through conduit 28, opening 27, around peripheral groove 26, through the hollow portion of shaft 10, through radial holes 17 to opening 18 and leaves the system through conduit 19. It is to be understood that the direction of flow has been chosen for illustrative purposes only and that this flow may be reversed if desired.

Since the centers of gravity of elements 22 and 24 are respectively to the left and right of the axis of shafts 10 and 16, rotation of these shafts will cause elements 22 and 26 to tend to move outwards towards plugs 21. This tendency is resisted by springs 23 and 25. The force tending to throw elements 22 and 24 towards plugs 21 varies directly and as the square of the rotational speed at any given radial distance from the axis of rotation. The opposing force generated in springs 23 and 25 varies directly and as the first power of the amount of movement from the position of rest. By a judicious selection of the weight and the contour of elements 22 and 24 and the length and stiffness of springs 23 and 25 practically any desired governing action may be obtained. Ordinarily it is desired that a throttling action start at a given speed and complete shut off be obtained at a second and higher speed.

If the speed of rotation of shafts 10 and 16 and cylindrical carriage 15 increases element 22 will move outward against the tension of spring 23 and peripheral groove 26 in element 22 will move gradually out of register with the openings in cylindrical carriage 15 and so throttle and eventually stop entirely the flow of fluid through the governor.

Element 24 has been incorporated in this device to maintain dynamic balance inasmuch as its movement is proportioned to that of element 22 so as to maintain the system in dynamic balance.

Retaining ring 30 has been provided in cylindrical element 15 to insure that hollow cylindrical element 22 at all times remains with its center of gravity between spring 23 and the axis of rotation of shaft 10. This insures that centrifugal force will tend to move hollow cylindrical element 22 against the tension of spring 23 rather than with such tension. Pin 31 serves a similar function for second cylindrical element 24, that is, it insures that the center of gravity of second cylindrical element 24 is located so that centrifugal force will act against the tension of spring 25 rather than with such tension.

Axial opening 32 in second cylindrical member 24 and the clearance 33 between pin 31 and hollow cylindrical member 22 have been provided to insure that damping of the movement of the governing members by entrapped oil cannot occur.

We claim as our invention:

1. A governor for the control of the flow of fuel to a prime mover comprising a driven shaft which is hollow for at least a protion of its length, a radial opening connecting the hollow portion of the driven shaft with a fuel conduit, a hollow cylindrical carriage secured to the end of the driven shaft with the hollow portion of the driven shaft in communication with the hollow portion of the cylindrical carriage and the axis of the cylindrical carriage and the hollow shaft disposed at right angles, a second hollow shaft coaxial with the driven shaft, secured to the opposite side of the hollow cylindrical carriage and in communication with the hollow portion of the cylindrical carriage, a fuel conduit in connection with said second hollow shaft, a hollow cylindrical element slidably mounted in said hollow carriage element and spring biased towards one end of the hollow carriage element, a second cylindrical element slidably mounted within the hollow portion of the first mentioned hollow cylindrical element and spring biased to move in a direction opposite to that of the first mentioned hollow cylindrical element, and a groove around the periphery of the first mentioned hollow cylindrical element, said groove in the at-rest position being in communication with the hollow portions of the driven shaft and the second hollow shaft, said hollow cylindrical element being restrained in its axial movement so that its center of gravity is at all times intermediate the axis of rotation of the governor shaft and the spring which urges said hollow cylindrical element, and said second cylindrical element being likewise restrained in its axial movement so that its center of gravity is at all times intermediate the axis of rotation of the governor shaft and the spring which urges said second cylindrical element.

2. A governor for the control of the flow of fuel to a prime mover comprising a driven shaft which is hollow for at least a portion of its length, a radial opening connecting the hollow portion of the driven shaft with a fuel conduit, a hollow cylindrical carriage secured to the end of the driven shaft with the hollow portion of the driven shaft in communication with the hollow portion of the cylindrical carriage and the axis of the cylindrical carriage and the hollow shaft disposed at right angles, a second hollow shaft coaxial with the driven shaft, secured to the opposite side of the hollow cylindrical carriage and in communication with the hollow portion of the cylindrical carriage, a fuel conduit in connection with said second hollow shaft, a hollow cylindrical element slidably mounted in hollow carriage element and spring biased towards one end of the hollow carriage element, a second cylindrical element slidably mounted within the hollow portion of the first mentioned hollow cylindrical element and spring biased to move in a direction opposite to that of the first mentioned hollow cylindrical element, and a groove around the periphery of the first mentioned hollow cylindrical element, said groove in the at-rest position being in communication with the hollow portions of the driven shaft and the second hollow shaft, said hollow cylindrical element and said second cylindrical element being spring biased by coaxial coil springs whose dimensions and stiffness are related to the mass and location of the hollow cylindrical element and the second cylindrical element so that dynamic balance is maintained over a wide range of rotative speeds, said hollow cylindrical element being restrained in its axial movement so that its center of gravity is at all times intermediate the axis of rotation of the governor shaft and the spring which urges said hollow cylindrical element, and said second cylindrical element being likewise restrained in its axial movement so that its center of gravity is at all times intermediate the axis of rotation of the governor shaft and the spring which urges said second cylindrical element.

3. A governor for the control of the flow of fuel to a prime mover comprising a driven shaft which is hollow for at least a portion of its length, a radial opening connecting the hollow portion of the driven shaft with a fuel conduit, a hollow cylindrical carriage secured to the end of the driven shaft with the hollow portion of the driven shaft in communication with the hollow portion of the cylindrical carriage and the axis of the cylindrical carriage and the hollow shaft disposed at right angles, a second hollow shaft coaxial with the driven shaft, secured to the opposite side of the hollow cylindrical carriage and in communication with the hollow portion of the cylindrical carriage, a fuel conduit in connection with said second hollow shaft, a hollow cylindrical element slidably mounted in hollow carriage element and spring biased towards one end of the hollow carriage element, a second cylindrical element slidably mounted within the hollow portion of the first mentioned hollow cylindrical element and spring biased to move in a direction opposite to that of the first mentioned hollow cylindrical element, and a groove around the periphery of the first mentioned hollow cylindrical element, said groove in the at-rest position being in communication with the hollow portions of the driven shaft and the second hollow shaft, said hollow cylindrical element being so disposed that its peripheral groove moves out of communication with the hollow portions of the driven shaft and the second hollow shaft as the hollow cylindrical element moves axially against the spring bias in response to the increasing rotative speed, said hollow cylindrical element being restrained in its axial movement so that its center of gravity is at all times intermediate the axis of rotation of the governor shaft and the spring which urges said hollow cylindrical element, and said second cylindrical element being likewise restrained in its axial movement so that its center of gravity is at all times intermediate the axis of rotation of the governor shaft and the spring which urges said second cylindrical element.

References Cited in the file of this patent

UNITED STATES PATENTS 1,347,208    Cockburn et al. _____ July 20, 1920